United States Patent
Grunbaum

(10) Patent No.: US 10,072,750 B2
(45) Date of Patent: Sep. 11, 2018

(54) SHIFTER APPARATUS

(71) Applicant: Michael Grunbaum, Ingleburn (AU)

(72) Inventor: Michael Grunbaum, Ingleburn (AU)

( * ) Notice: Subject to any disclaimer, the term of this patent is extended or adjusted under 35 U.S.C. 154(b) by 1271 days.

(21) Appl. No.: 14/058,763

(22) Filed: Oct. 21, 2013

(65) Prior Publication Data
US 2014/0305242 A1    Oct. 16, 2014

(30) Foreign Application Priority Data
Apr. 12, 2013    (AU) ................................ 2013204392

(51) Int. Cl.
 *B60K 20/00* (2006.01)
 *F16H 59/04* (2006.01)
 *F16H 61/686* (2006.01)

(52) U.S. Cl.
 CPC ........... *F16H 59/04* (2013.01); *F16H 59/041* (2013.01); *F16H 61/686* (2013.01); *Y10T 74/2014* (2015.01)

(58) Field of Classification Search
 CPC ...... F16H 59/04; F16H 59/041; F16H 61/686; F16H 2059/048; F16H 59/10
 See application file for complete search history.

(56) References Cited

U.S. PATENT DOCUMENTS

| | | | | |
|---|---|---|---|---|
| 5,471,894 A | * | 12/1995 | McFadden | F16H 59/04 477/115 |
| 2010/0050759 A1 | * | 3/2010 | Vickio, Jr. | G01M 15/02 73/116.06 |

OTHER PUBLICATIONS

Grunbaum, "Vertical gate shifter for Lenco transmission" [video file]. (Jan. 12, 2012), Retrieved from http://youtu.be/07_y-svxn0M.

* cited by examiner

*Primary Examiner* — Zakaria Elahmadi
(74) *Attorney, Agent, or Firm* — Shutts & Bowen LLP

(57) ABSTRACT

A shifter apparatus for manually changing gear ratio in a planetary gear transmission, said planetary gear transmission being of the type which comprises a plurality of actuators, wherein the sequential actuation of said actuators progressively causes a change of gear ratio in said planetary gear transmission. The shifter apparatus advantageously provides a single lever which can be quickly and easily shifted by a user.

5 Claims, 5 Drawing Sheets

SHIFTER APPARATUS

CROSS REFERENCE TO RELATED APPLICATIONS

This application claims the priority to Australian Patent Application No. 2013204392 filed Apr. 12, 2013, the disclosure of which is incorporated fully by reference.

TECHNICAL FIELD

The present invention relates to a shifter apparatus for selectively changing gear ratio for a planetary gear transmission.

BACKGROUND OF THE INVENTION

In high performance motor sport, such as drag racing, a popular gear transmission drive is the Lenco transmission sold by the Lenco Equipment Company. The Lenco transmission is a planetary gear transmission system. The Lenco system provides a modular system, each module having an actuator, which when actuated, causes a gear ratio change which effectively changes gear for the vehicle. A typical racing car would employ a 4 or 5 speed transmission which equates to a 3 or 4 module Lenco transmission system.

To change from low to high speed gear in the Lenco system requires the progressive and sequential activation of the actuators, which requires the manual activation of a shifter apparatus.

The current Lenco transmission system is sold with a mechanical shifter apparatus which comprises a plurality of levers. Each lever being linked to, and associated with, a respective actuator. Hence, to rise through the gears requires the sequential shifting of the levers in turn.

Considering that in a race condition, the progressive shifting of each gear may occur very quickly, and potentially every 0.8 second, having multiple levers provides a very cumbersome arrangement. In race conditions requiring fast reaction times and the need to be sequentially and progressively actuating the actuators, the multi-lever shifter apparatus provides problematic issues in that the wrong lever could be shifted out of the required sequence. This is particularly true for those unfamiliar with the multi-lever arrangement.

It is an object of the present invention to provide an alternative mechanical shifter apparatus which avoids the need to employ a cumbersome multi-lever arrangement.

SUMMARY OF THE INVENTION

According to the present invention there is provided a shifter apparatus for manually changing gear ratio in a planetary gear transmission, said planetary gear transmission being of the type which comprises a plurality of actuators, wherein the sequential actuation of said actuators progressively causes a change of gear ratio in said planetary gear transmission, said shifter apparatus comprising:

a housing which comprises a plurality of substantially horizontal tracks, said tracks being arranged above one another, the tracks comprise openings, each opening providing a passage between adjacent tracks, the openings are arranged adjacent alternating ends of the tracks when the tracks are considered sequentially from the uppermost track to the bottommost track;

arranged in each track is a slider, each slider is connected to a respective one of said plurality of actuators by a linkage; wherein moving a slider from one end of the respective track to the other causes the respective actuator to actuate, each slider having a groove, said groove being formed so as to align with an opening when the slider is positioned in the respective track adjacent the opening; and a lever arranged to be manually movable between two positions, said lever is connected to a driving member, said driving member comprising a slider engaging portion, wherein said slider engaging portion is sized and arranged to be accommodated in the groove of an instant slider, wherein the slider engaging portion drives the instant slider to move from one end of the respective track to the other when the lever is moved between one position to the other position; wherein, when the groove of the instant slider is aligned with an opening to a lower adjacent track, the slider engaging portion falls through the opening and into the groove of the respective slider in the lower adjacent track;

wherein, from an initial arrangement in which the slider engaging portion is located in the groove of the uppermost slider and the uppermost slider is positioned in the respective uppermost track where the respective actuator is disengaged, alternately moving the lever between the two positions causes each slider to sequentially move along the respective tracks, from uppermost to bottommost, and thereby sequentially actuate the plurality of actuators.

The shifter apparatus advantageously provides a single lever which can be quickly and easily shifted by a user.

BRIEF DESCRIPTION OF THE DRAWINGS

An illustrative example of a preferred embodiment of the present invention will now be described with reference to the accompanying figures, in which:

FIG. 3 is a cross-sectional view along lines A-A of FIG. 2a;

DETAILED DESCRIPTION OF THE INVENTION

Figure 1:
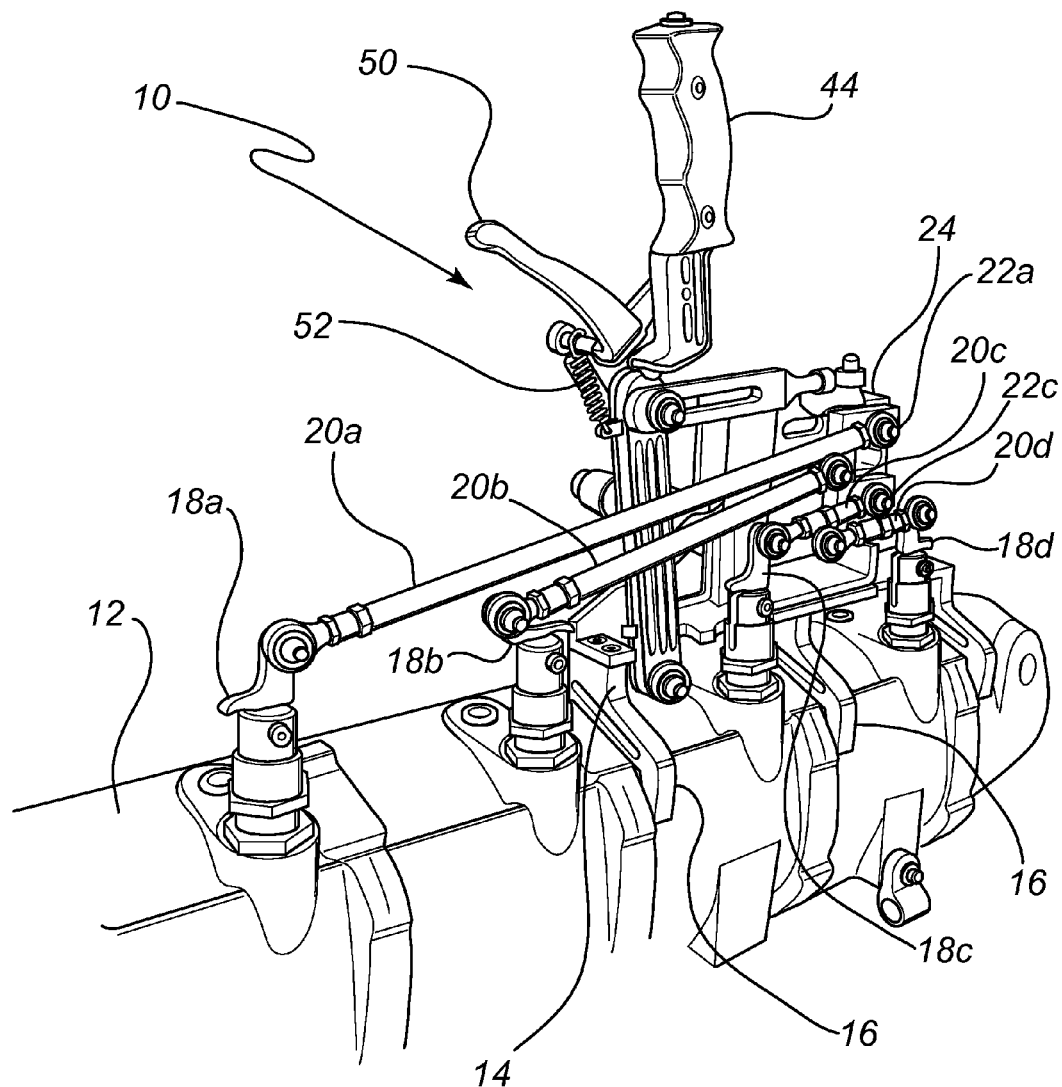
FIG. 1 is a view of a shifter apparatus according to a preferred embodiment.
Figure 4:
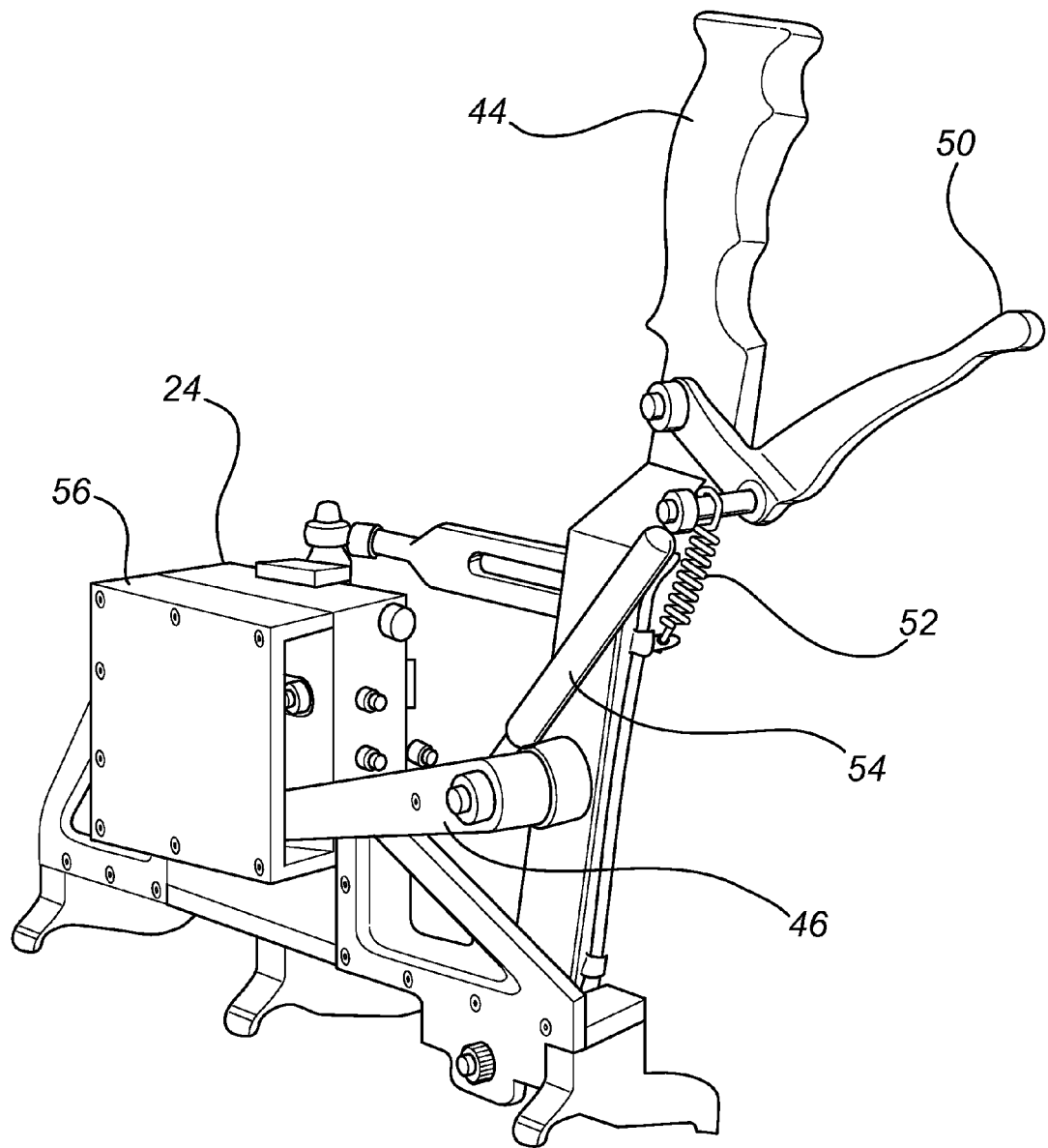
FIG. 4 is a rear view of the shifter apparatus of FIG. 1.

FIGS. 1 and 4 show the shifter apparatus 10 mounted on the casing of a planetary gear transmission drive 12 by way of a mounting frame 14 which can be bolted onto the drive 12. The transmission drive 12 illustrated is the LENCO CS3 sold by Lenco Racing Transmissions of California, USA. The LENCO CS3 is a modular system. The illustrated drive has four modules which equates to a five-speed transmission. The mounting frame 14, as shown, consists of base arms 16 integrally formed with the shifter apparatus 10.

To progress from low gear to high gear in the LENCO transmission requires the sequential actuation of actuators 18a, 18b, 18c, 18d. The actuation of each actuator 18a, 18b, 18c, 18d causes a gear ratio change in the transmission drive 12. The actuators 18a, 18b, 18c, 18d shown are in the form of pivotal members which are pivoted between an actuated position and a deactuated position. Each actuator 18a, 18b, 18c, 18d is self-locking in each position until a sufficient force is applied to cause the actuator 18a, 18b, 18c, 18d to pivot.

As shown, each actuator 18a, 18b, 18c, 18d is connected to one end of a linkage 20a, 20b, 20c, 20d. The other end of the linkage 20a, 20b, 20c, 20d is connected to a slider 22a, 22b, 22c, 22d of the shifter apparatus 10. The movement of a slider 22a, 22b, 22c, 22d causes movement of the linkage 22a, 22b, 22c, 22d with sufficient force to cause the movement of the actuator 18a, 18b, 18c, 18d, hence actuating the actuator 18a, 18b, 18c, 18d. The linkage 20a, 20b, 20c, 20d is connected at each end by bolts.

The slider mechanism is shown clearly in FIGS. 2a-2e and 3. A housing 24 is provided with a number of substantially horizontal tracks 26a, 26b, 26c, 26d. In the embodiment illustrated, four tracks 26a, 26b, 26c, 26d are shown. The tracks 26a, 26b, 26c, 26d are arranged above one another. The tracks 26a, 26b, 26c, 26d comprise openings 28a, 28b, 28c positioned adjacent alternating ends of the arrangement of tracks 26a, 26b, 26c, 26d. The openings 28a, 28b, 28c provide a passage between adjacent tracks 26a, 26b, 26c, 26d.

Each track 26a, 26b, 26c, 26d comprises guide rails 30 extending along the length of the track 26a, 26b, 26c, 26d and projecting from the upper and lower surfaces of the track 26a, 26b, 26c, 26d.

Within each track 26a, 26b, 26c, 26d is arranged a slider 22a, 22b, 22c, 22d. Each slider 22a, 22b, 22c, 22d is formed of two pieces 32a, 32b having mating projections and holes. One projection 34 comprises a screw threaded end 38 to allow the respective linkage 22a, 22b, 22c, 22d to be bolted thereto. Plastic spacers 40 are arranged between the two pieces 32a, 32b on the intermediate projections. The spacers 40 provide a gap between the two pieces 32a, 32b which allows the slider 22a, 22b, 22c, 22d to straddle the guide rails 30 on the track 26a, 26b, 26c, 26d.

Each slider 22a, 22b, 22c, 22d is formed with a groove 42a, 42b, 42c, 42d. The groove 42a, 42b, 42c, 42d is formed and shaped so as to align with an opening 28a, 28b, 28c between tracks 26a, 26b, 26c, 26d when the slider 22a, 22b, 22c, 22d is positioned adjacent the opening 28a, 28b, 28c.

Driving a slider 22a, 22b, 22c, 22d from one end of the respective track 26a, 26b, 26c, 26d to the other end causes the attached linkage 20a, 20b, 20c, 20d to move and in turn move the attached actuator 18a, 18b, 18c, 18d, thereby actuating the actuator 18a, 18b, 18c, 18d.

The sliders 22a, 22b, 22c, 22d are moved in their tracks 26a, 26b, 26c, 26d by the manual manipulation of a lever 44. The lever 44 is arranged to be moved back and forth between two positions.

Pivotally attached to the lever 44 is a driving arm 46. The driving arm 46 comprises a slider engaging protrusion 48 which, initially, is arranged to sit in the groove 42a of the uppermost slider 22a, see FIG. 3.

In order to progress from lowest to highest gear, a user needs only to alternately move the lever 44 back and forth between its two positions.

Figure 2A:
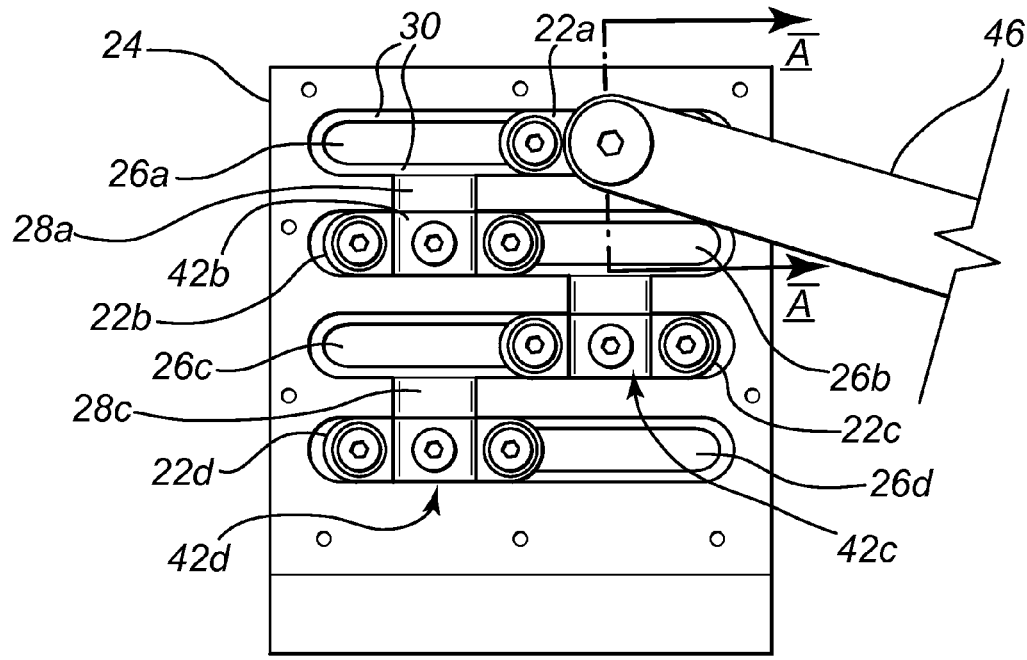
FIGS. 2a to 2e, show the slider mechanism of the shifter apparatus of FIG. 1 progressing from lowest to highest gear.
Figure 2B:
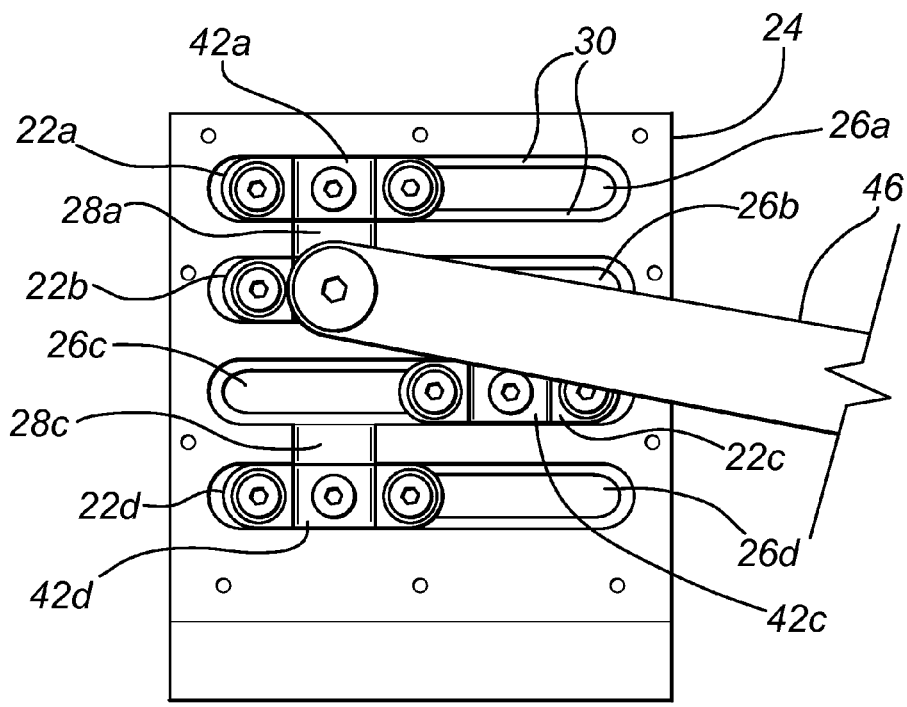
Figure 2C:
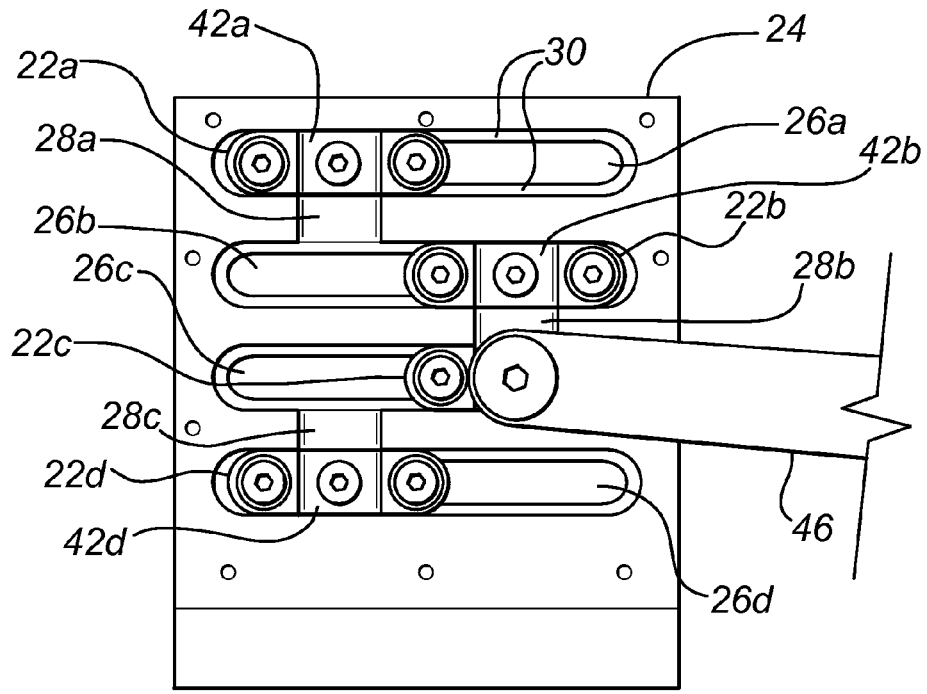
Figure 2D:
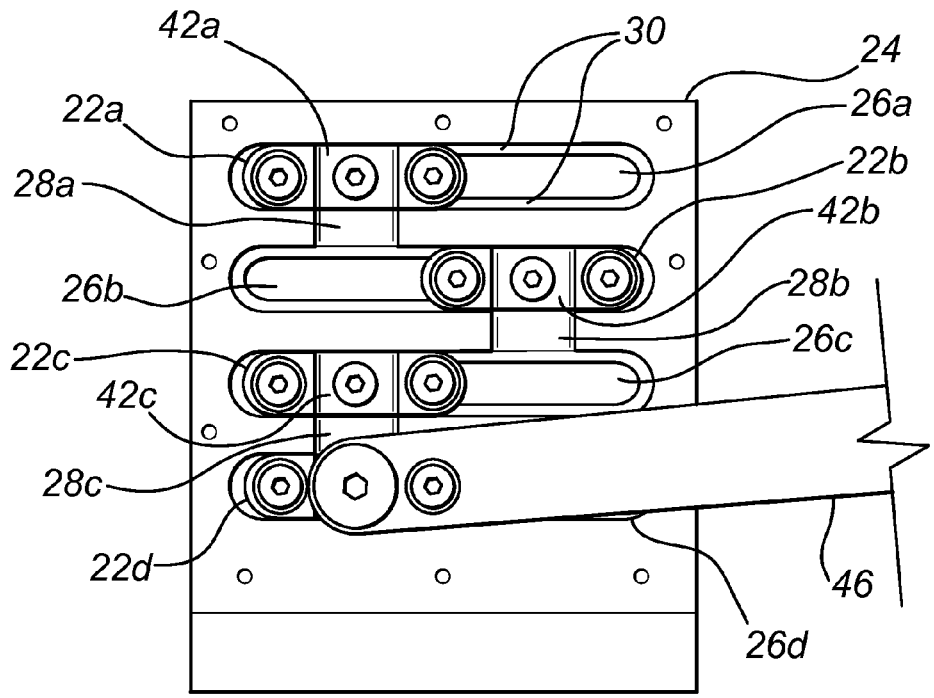

Initially, when the LENCO transmission 12 is in lowest gear, whereby no actuators 18a, 18b, 18c, 18d are actuated. The sliders 22a, 22b, 22c, 22d are arranged as shown in FIG. 2a, with the protrusion 48 of the driving arm 46 sitting in the groove 42a of the uppermost slider 22a.

To rise to the next gear, the lever 44 is moved whereby the driving arm 46 pushes the uppermost slider 22a along its track 26a to the other end. Moving the slider 26a causes the linkage 20a to move and thereby actuate the connected actuator 18a. At the other end, the groove 42a of the uppermost slider 22a aligns with the opening 28a and the protrusion 48 of the driving arm 46 falls under gravity through the opening 28a into the groove 42b of the second slider 22b in the adjacent track 26b, see FIG. 2b.

Moving the lever 44 back to its original position causes the second slider 22b to move along its track 26b to the other end. Again, this causes the associated actuator 18b to actuate. The protrusion 48 of the driving arm 46 then falls through the next opening 28b into the groove 42c of the next slider 22c arranged in the adjacent track 26c, see FIG. 2c.

Figure 2E:
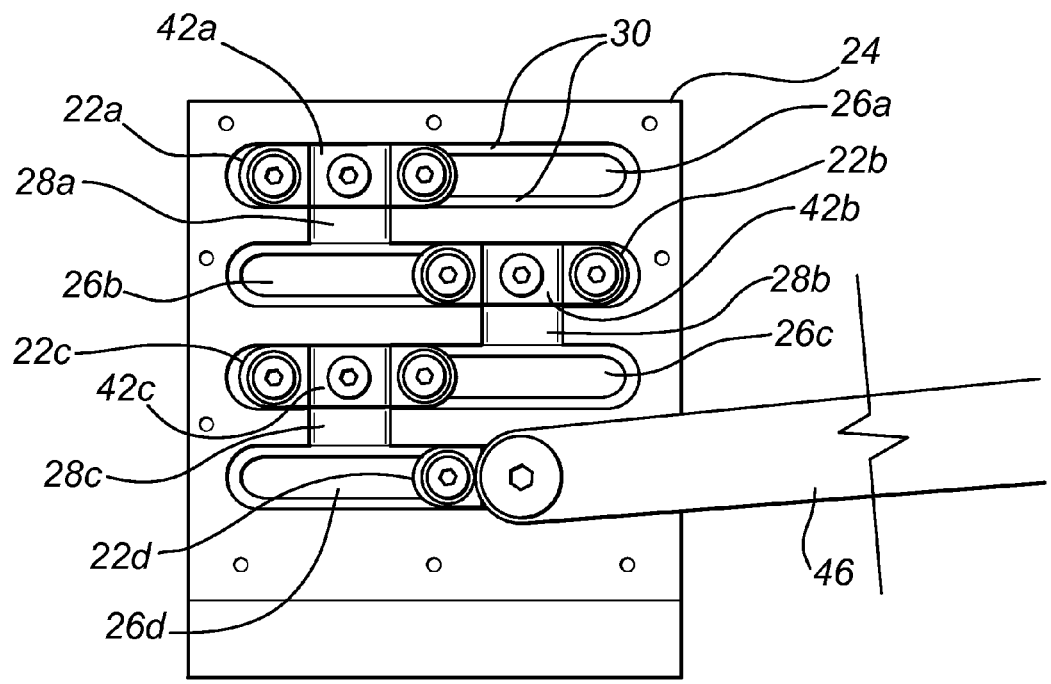
Figure 3:
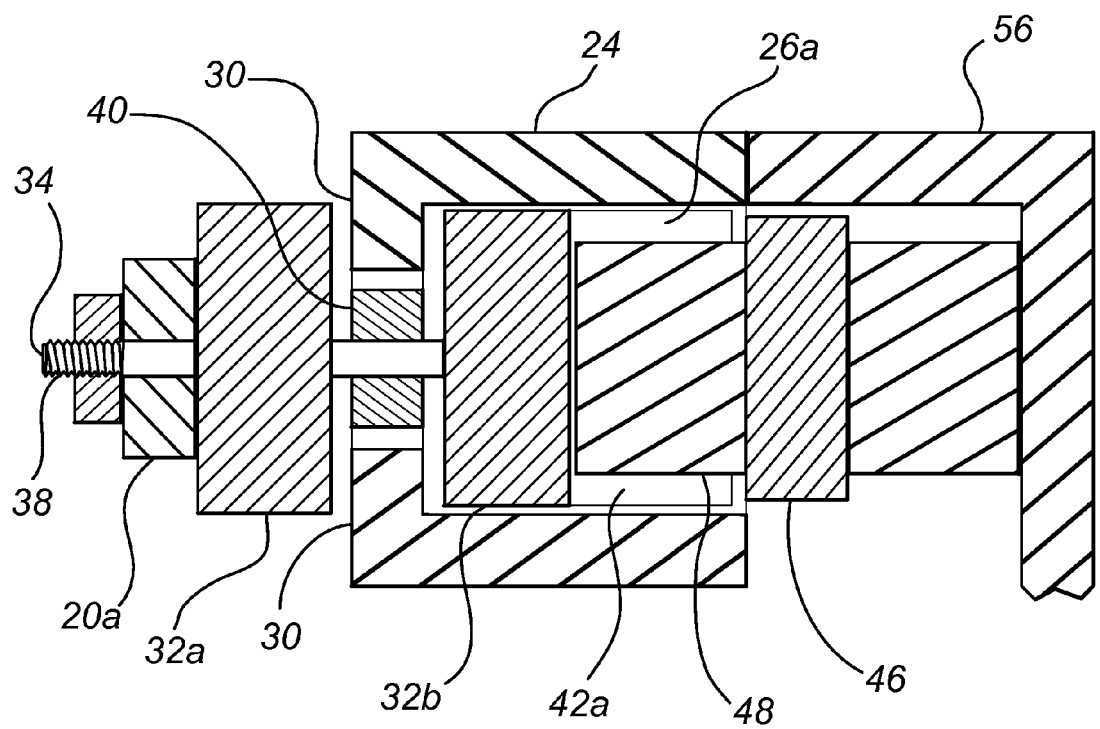

The process proceeds until all sliders 22a, 22b, 22c, 22d have been actuated and all actuators 18a, 18b, 18c, 18d have been actuated, at which point the LENCO transmission 12 is in the highest gear, see FIG. 2e.

The shifter apparatus 10 is further adapted to allow the reverse sequential progression from high to low gear. This is facilitated by a biasing actuator arrangement which comprises a second lever 50 which is arranged so as to be manually gripped while gripping the main lever 44. The second lever 50 is connected to a spring 52 and an arm 54 which, in turn, is connected to the driving arm 46. When the second lever 50 is actuated, the spring 52 biases the driving arm 46 to want to rise.

Consequently, by moving the lever 44 back and forth between the two positions while actuating the second lever 50, the slider mechanism works in reverse from that described before. When an instant slider 22d is aligned with an upper opening 28c, the protrusion 48 of the driving arm 46 rises (as opposed to falling) to the slider 22c arranged in the upper adjacent track 26c.

As shown in FIG. 4, the slider mechanism is enclosed by a cover 56, through which the driving arm 46 can extend.

In the embodiment described, all the components can be formed of aluminium which, while durable, is beneficially light enough to benefit weight considerations in racing car conditions. It will be appreciated that the components could be made of other suitable metals.

While the embodiment described is suited to a five-speed transmission, it will be appreciated that the shifter apparatus could be readily adapted for use with transmission of lesser or greater speeds by providing less or more, as appropriate, sliders, tracks and linkages.

Furthermore, it is envisioned that the shifter apparatus 10, described, could be adapted for a four-speed transmission simply by removing the lowest slider 22d from its track 26d and inserting some form of plug which would block opening 28c. Consequently, when the transmission is in highest gear, the protrusion 48 of the driving arm 46 is prevented from falling through opening 28c and remains in the groove 42c of slider 22c.

The invention claimed is:

1. A shifter apparatus for manually changing gear ratio in a planetary gear transmission, said planetary gear transmission being of the type which comprises a plurality of actuators, wherein the sequential actuation of said actuators progressively causes a change of gear ratio in said planetary gear transmission, said shifter apparatus comprising:

a housing which comprises a plurality of substantially horizontal tracks, said tracks being arranged above one another, the tracks comprise openings, each opening providing a passage between adjacent tracks, the openings are arranged adjacent alternating ends of the tracks when the tracks are considered sequentially from the uppermost track to the bottommost track;

arranged in each track is a slider, each slider is connected to a respective one of said plurality of actuators by a linkage; wherein moving a slider from one end of the respective track to the other causes the respective actuator to actuate, each slider having a groove, said groove being formed so as to align with an opening when the slider is positioned in the respective track adjacent the opening; and a lever arranged to be manually movable between two positions, said lever is connected to a driving member, said driving member comprising a slider engaging portion, wherein said slider engaging portion is sized and arranged to be accommodated in the groove of an instant slider, wherein the slider engaging portion drives the instant slider to move from one end of the respective track to the other when the lever is moved between one position to the other position; wherein, when the groove of the instant slider is aligned with an opening to a lower adjacent track, the slider engaging portion falls through the opening and into the groove of the respective slider in the lower adjacent track;

wherein, from an initial arrangement in which the slider engaging portion is located in the groove of the uppermost slider and the uppermost slider is positioned in the respective uppermost track where the respective actuator is disengaged, alternately moving the lever between the two positions causes each slider to sequentially move along the respective tracks, from uppermost to bottommost, and thereby sequentially actuate the plurality of actuators.

2. The shifter apparatus of claim 1, further comprising a biasing actuator, said biasing actuator, when actuated, causing said slider engaging portion to rise instead of fall, such that when the slider engaging portion is accommodated in the groove of an instant slider which is aligned with an opening to an upper adjacent track, the slider engaging portion rises through the opening and into the groove of the respective slider in the upper adjacent track; wherein alternately moving the lever between the two positions while the biasing actuator is actuated thereby sequentially de-actuates the plurality of actuators.

3. The shifter apparatus of claim 2, wherein said biasing actuator comprises a manually actuable lever interconnected with said driving member.

4. The shifter apparatus of claim 1, wherein said apparatus is able to be mounted to the housing of the planetary gear transmission.

5. The shifter apparatus of claim 1, wherein each track comprises a guide rail which is straddled by the respective slider to retain and guide the respective slider on the track.

\* \* \* \* \*